US005684380A

United States Patent [19]

Woody et al.

[11] Patent Number: 5,684,380

[45] Date of Patent: Nov. 4, 1997

[54] OIL COOLED HIGH POWER INDUCTIVE COUPLER

[75] Inventors: George R. Woody, Redondo Beach; Sergio Ramos, Harbor City; Juventino Rosas, Los Angeles, all of Calif.

[73] Assignee: Delco Electronics Corp., Kokomo, Ind.

[21] Appl. No.: 686,891

[22] Filed: Jul. 26, 1996

[51] Int. Cl.[6] .................... H01M 10/46

[52] U.S. Cl. .................... 320/2; 336/57; 336/DIG. 2

[58] Field of Search .................... 320/2, 5; 336/DIG. 2, 336/55, 57, 58, 61, 179

[56] References Cited

U.S. PATENT DOCUMENTS

| | | | |
|---|---|---|---|
| 5,157,319 | 10/1992 | Klontz et al. | 320/2 |
| 5,216,402 | 6/1993 | Carosa | 336/83 |
| 5,264,776 | 11/1993 | Hulsey | 320/21 |
| 5,327,065 | 7/1994 | Bruni et al. | 320/2 |
| 5,341,280 | 8/1994 | Divan et al. | 320/2 X |
| 5,412,304 | 5/1995 | Abbott | 320/2 |
| 5,506,489 | 4/1996 | Abbott et al. | 320/2 |
| 5,545,966 | 8/1996 | Ramos et al. | 320/2 |
| 5,568,036 | 10/1996 | Hulsey et al. | 320/2 |

*Primary Examiner*—Edward Tso

*Attorney, Agent, or Firm*—Mark A. Navarre

[57] ABSTRACT

An oil cooled inductive coupler for use with an inductive charging system that charges propulsion batteries of an electric vehicle. The coupler is connected to a power source by way of a coaxial cable that has power conductors for coupling power to the coupler, and cooling channels for coupling high dielectric strength cooling fluid to and from the coupler. The coupler has a housing with a flood box formed therein having an open interior that forms a conductor termination area. The cooling channels are coupled to the flood box, and the power conductors are terminated in the termination area and are exposed to the cooling fluid that is pumped therethrough to cool them. A heat exchanger having a fluid flow path therethrough is coupled to the flood box and permits the cooling fluid to circulate therethrough. A primary winding is secured or bonded to the heat exchanger, a magnetic puck is disposed in an opening in the heat exchanger, and upper and lower primary winding covers enclose the heat exchanger. The cooling fluid is pumped through the coaxial cable, the flood box and the heat exchanger to cool the primary winding, the magnetic puck, and the power conductors, to permit high power levels to be transferred between the power source and the propulsion batteries of the electric vehicle.

2 Claims, 5 Drawing Sheets

33a
38
32
22a
36
41
37
34
30
41
23b
33b
23
23a
38
22b
14
20

OIL COOLED HIGH POWER INDUCTIVE COUPLER

BACKGROUND

The present invention relates generally to inductive couplers, and more particularly, to an improved high power oil cooled inductive coupler for use in electric vehicle battery charging applications.

The assignee of the present invention designs and manufactures Magnecharge™ inductive charging systems for use in charging batteries of electric vehicles. The charging system employs a charge port located in an electric vehicle into which an inductive coupler is inserted to charge the propulsion batteries of the electric vehicle. The inductive coupler comprises a primary winding of a transformer and the charge port comprises a secondary winding of the transformer. The inductive charging system couples high frequency, high voltage AC power to the transformer which charges the batteries of the electric vehicle.

Inductive couplers previously developed by the assignee of the present invention were relatively thin, which did not permit their cooling which is necessary for high power charging. Earlier couplers used an ethylene glycol and water mixture for cooling. Although the ethylene glycol and water mixture is a relatively efficient cooling medium, this liquid is conductive and must be separated from current carrying components of the charger. The use of the ethylene glycol and water mixture make direct cooling of live terminations impossible.

Accordingly, it is an objective of the present invention to provide for a high power oil cooled inductive coupler for use with an inductive charging system that is used to charge propulsion batteries of an electric vehicle.

SUMMARY OF THE INVENTION

To meet the above and other objectives, the present invention provides for a high power oil cooled inductive coupler for use with an inductive charging system that charges propulsion batteries of an electric vehicle. The oil cooled inductive coupler is coupled by way of a coaxial cable to a power source. The coaxial cable includes power conductors for coupling power to the coupler, and cooling channels for coupling high dielectric strength cooling fluid to and from the coupler. The coupler has a housing comprising a handle that is typically formed using two mating half shells.

A flood box is disposed within the housing that has an open interior that forms a conductor termination area. The cooling channels are coupled to the flood box, and the power conductors are terminated in the termination area and are exposed to cooling fluid that is pumped therethrough to cool them. A heat exchanger having a fluid flow path therethrough is coupled to the flood box and permits cooling fluid to circulate therethrough. A primary winding is secured or bonded to the heat exchanger and a magnetic puck is disposed in an opening through the heat exchanger. Upper and lower primary winding covers enclose the heat exchanger. The cooling fluid is pumped through the coaxial cable, the flood box and the heat exchanger to cool the primary winding, the magnetic puck, and the power conductors to permit high power levels to be transferred between the power source and the propulsion batteries of the electric vehicle.

The present inductive coupler is thicker than previous versions and is designed as a standard interface for inductive charger systems developed by the assignee of the present invention. The thicker shape accommodates power charging levels to at least 130 KW. A high dielectric strength cooling fluid (oil) is used to cool a cable termination area, primary winding, and a ferrite magnetic puck in order to make high power transfer possible. The high dielectric strength oil cools the primary winding using a heat exchanger to which the primary winding is laminated. The ferrite magnetic puck, which should have a casual contact temperature on the order of 95 degrees Celsius, is cooled by bonding its periphery to an opening in the heat exchanger. Also the oil is used to directly cool the cable termination area by direct flush cooling it.

The electric vehicle charging systems developed by the assignee of the present invention previously used a coupler design that was too thin for use at high charging rates. A thin cross section heat exchanger causes pressure drops that form across the coupler to be too high to be practical. The thicker coupler design of the present invention allows for heat exchangers to be used that permit higher power charging levels. The thicker design is also compatible with lower charge levels, such as 6.6 KW or less, which does not require a heat exchanger to cool the primary winding.

In addition, there are tactile feel features on the side of the coupler which use conductive plastic that contact copper fingers in the charge port for EMI control. This is needed because the thicker coupler uses a larger slot width in the charge port, which can cause increased radiated emissions. The coupler also has features that are employed to engage a locking mechanism. The previously designed termination area was bulky due to the size needed to dissipate heat. Using the present flush cooling design, a smaller more compact termination area is made possible.

The present invention has been designed for use in inductive coupling transformers of the Magnecharge™ electric vehicle charging systems manufactured by the present assignee. In particular, the high power coupler has been developed for use in an Opportunity™ charge station which is used by individuals to charge the propulsion batteries of their electric vehicles. The coupler design allows high power charging with an ergonomic design that meets touch temperature requirements as specified by Underwriter's Laboratories for consumer use.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
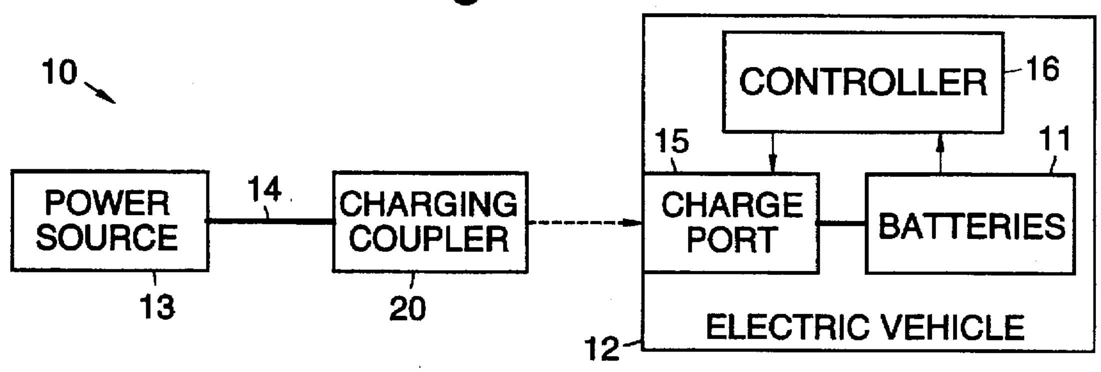
FIG. 1 is a block diagram that illustrates an inductive charging system employing an inductive coupler in accordance with the principles of the present invention.

Referring to the drawing figures, FIG. 1 is a block diagram that illustrates a typical inductive charging system 10 employing an inductive charging coupler 20 in accordance with the principles of the present invention. The inductive charging system 10 is comprised of a power source 13 that is connected by a power cable 14 to the inductive charging coupler 20. The power cable 14 contains power handling conductors 25 comprising inner and outer power conductors **25*a*, 25*b* (FIGS. 4 and 8), a coaxial RF cable 25*c* (FIG. 4) used for communication, and flow paths for high dielectric strength cooling fluid 26 (FIGS. 6–8) that is pumped therethrough. The high dielectric strength cooling fluid 26 may comprise an oil such as poly alpha olefin (PAO), for example. The inductive charging coupler 20 is designed to be inserted into a charge port 15 located in an electric vehicle 12 (indicated by the dashed arrow). The inductive charging coupler 20 comprises a primary of a transformer while the charge port 15 comprises the secondary thereof. Once the inductive charging coupler 20 is inserted into the charge port 15, power is transferred from the power source 13 to propulsion batteries 11 of the electric vehicle 12**.

Figure 2:
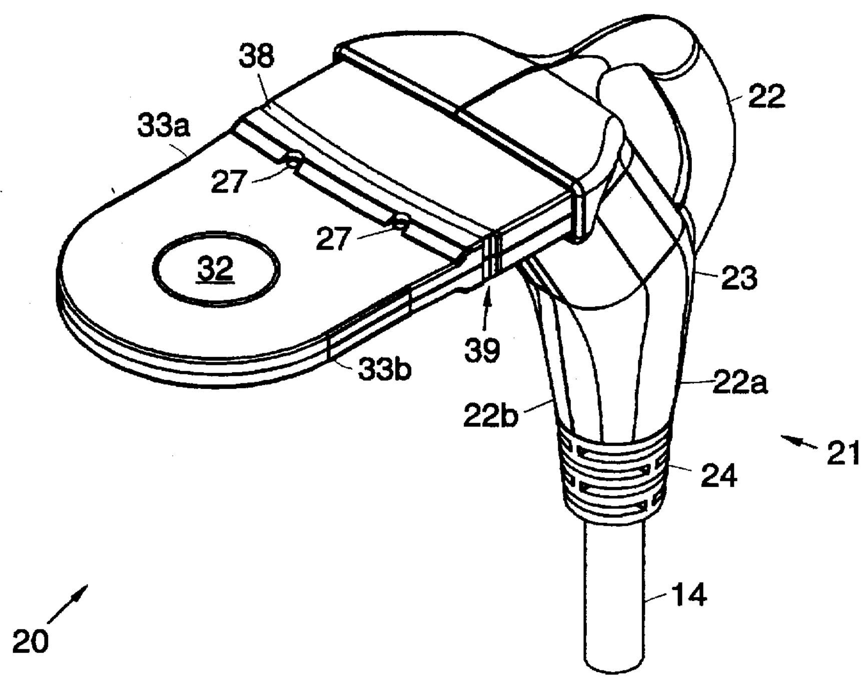
FIG. 2 is a perspective view of an inductive coupler in accordance with the present invention.
Figure 3:
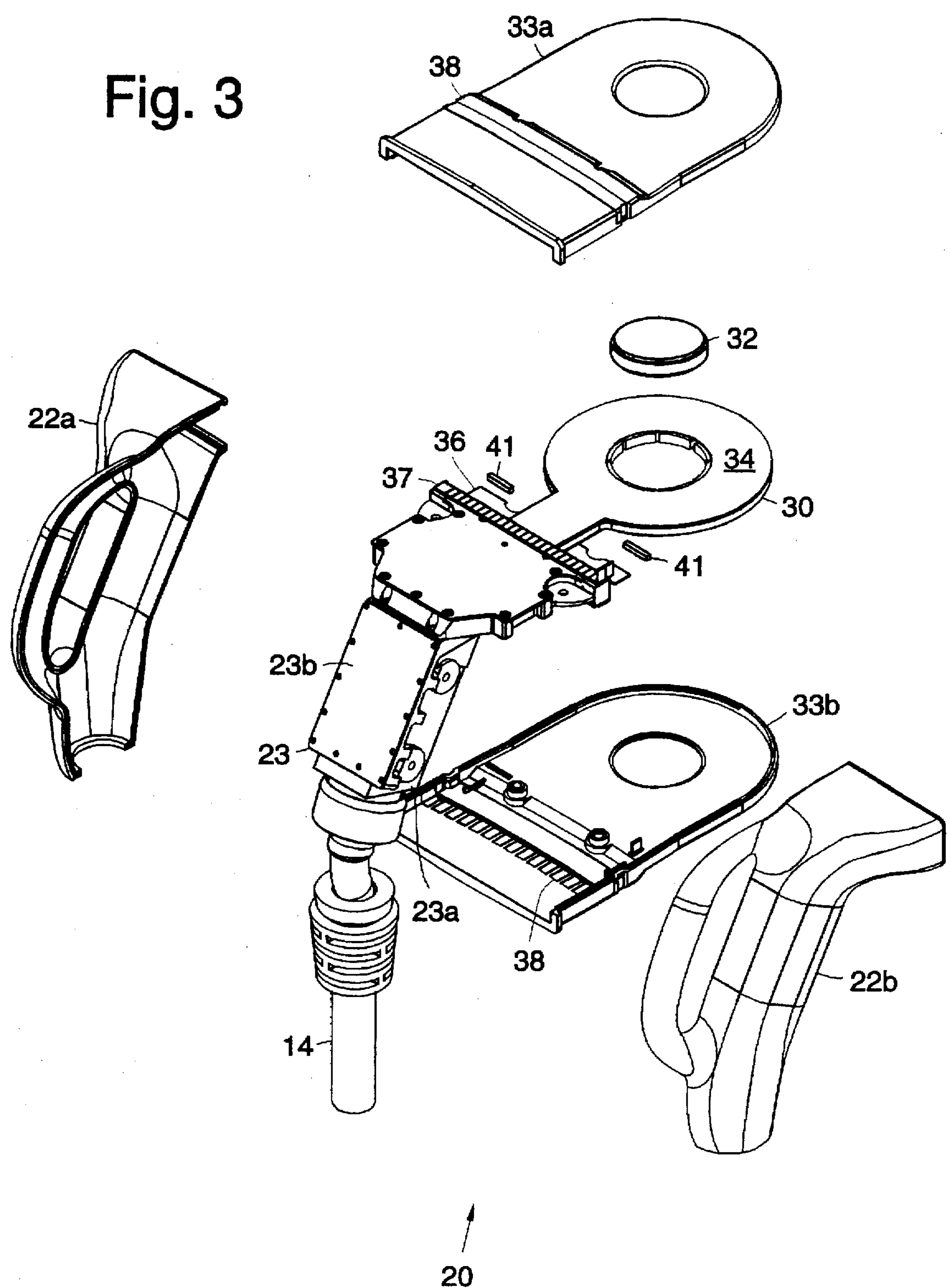
FIG. 3 is an exploded perspective view of the inductive coupler of FIG. 2.
Figure 4:
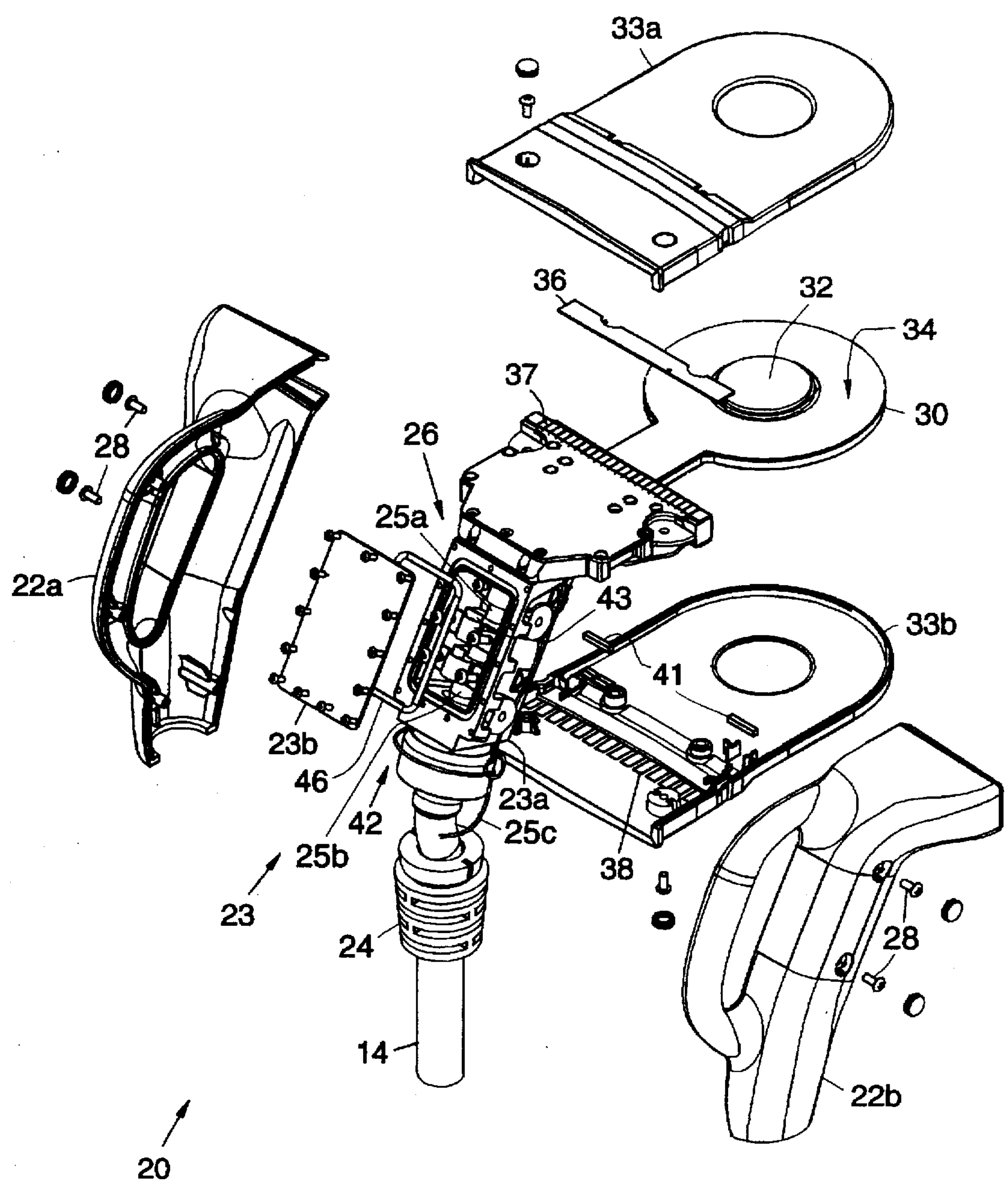
FIG. 4 is a more detailed exploded perspective view of the inductive coupler of FIG. 3.

FIG. 2 is a perspective view of the inductive coupler 20, while FIGS. 3 and 4 show exploded perspective views of the inductive coupler 20 detailing its interior. The inductive coupler 20 comprises a plastic housing 21 that includes a plastic handle 22 that is formed by two mating half shells **22*a*, 22*b* that surround a flood box 23 that is used as a termination area. The mating half shells 22*a*, 22*b* captivate a strain relief 24 that surrounds the coaxial cable 14 used to conduct power and cooling fluid between the power source 13 and the coupler 20. Details of the coaxial cable 14 are shown with reference to FIG. 8. The flood box 23 comprises a housing 23*a* with a cover 23*b* and its interior forms the termination area, which is visible in FIG. 4. Power conductors 25 (FIG. 4) of the coaxial cable 14 are routed through the termination area of the flood box 23 and are exposed to the cooling fluid 26 (oil 26) that is pumped therethrough to cool the conductors 25. The plastic components of the coupler 20 may be bonded, ultrasonic welded, or hot plate welded together, and screws 28 (FIG. 4) may be used to provide additional strength. The coupler 20 has a thickness of 0.600 inches and mates to a similarly sized opening in the charge port 15**.

A heat exchanger 30 (FIG. 3) having a fluid flow path 31 therethrough is coupled to the flood box 23 so that the cooling fluid 26 can circulate therethrough. A ferrite magnetic center core 32 or puck 32 is disposed at the center of the heat exchanger 30 in an opening **30*a* therein (FIG. 4). Upper and lower plastic primary winding covers 33*a*, 33*b* mate together to enclose the heat exchanger 30**.

A primary winding 34 is laminated or otherwise bonded to the heat exchanger 30. Details of the primary winding 34 are shown FIG. 5. The primary winding 34 has a predetermined number of turns **35*a* (or windings 35*a*) stacked in a plurality of layers 35*b* separated by insulators 35*c*. At least one of the turns 35*a* (and typically two turns) comprises a spiral multi-turn winding 35*a* such that the number of layers 35*b* is less than the number of turns 35*a*. The spiral/helical foil windings 35*a*** are used to improve thermal management and provide for higher power handling capacity.

An antenna 36 which may comprise traces formed on a printed wiring board, for example, is coupled to the conductors 25 of the power cable 14. The antenna 36 is used to transfer communication signals transmitted by carrier along the conductors 25 to electronics in the vehicle 12.

A plurality of openings 27 (FIG. 2) are provided through the upper and lower primary winding covers **33*a*, 33*b* that are used to mate with a locking mechanism (not shown) that may be employed in the charge port 15. One locking mechanism that may be employed is described in U.S. patent application Ser. No. 08/703,277, filed Aug. 26, 1996 entitled "Charger Locking Mechanism", assigned to the assignee of the present invention. Tactile feel indents 39 are provided along the sides of the coupler 20 which are depressions that engage spring loaded members (not shown) located in the charge port 15. The tactile feel indents 39 in conjunction with the spring loaded members provide a user with positive feedback that the coupler 20 is fully inserted into the charge port 15**.

A plurality of electromagnetic interference fingers 37 are disposed at an end of the flood box 23 adjacent the heat exchanger 30 that mate with conductive plastic strips 38 that are coupled to the primary winding covers **33*a*, 33*b*. The conductive plastic strips 38 in turn mate with a metal portion of the charge port 15 to provide continuous shielding to suppress electromagnetic interference radiated by the system 10. A plurality of magnets 41 are attached to the housing covers 33*a*, 33*b* that are used to activate a proximity switch (not shown) located in the charge port 15 that provides an indication that the charging coupler 20 is properly inserted into the charge port 15**.

With specific reference to FIG. 3, it shows internal details of the housing 21, the heat exchanger 30, and the primary winding 34 of the coupler 20, wherein four of the plastic coupler components are pulled away. The four components include the handle shells **22*a*, 22*b* and the upper and lower primary winding covers 33*a*, 33*b*. The electromagnetic interference fingers 37 are shown disposed above and below internal surfaces of the conductive plastic strips 38 and which engage when the upper and lower primary winding covers 33*a*, 33*b*** are mated together.

FIG. 4 shows a exploded view of the coupler 20 illustrating the details of the flood box 23 and heat exchanger 30. The flood box cover **23*b* is sealed to the flood box 23 by means of a seal 46. The flood box 23 contains cooling fluid 26 (oil 26) which is pumped through the system 10 to cool the area where the cable 25 and ends of the primary winding 34 mate and are terminated. The conductors 25 of the power cable 14 is stripped and soldered to the antenna 36. The power cable 14 is a coaxial type cable such as is disclosed in U.S. patent application Ser. No. 08/348,666, filed Dec. 2, 1994, entitled "Environmentally Controlled High Power High Frequency Transmission Cable" assigned to the assignee of the present invention. However, details of the power cable 14 are provided herein with reference to FIG. 8**.

However, as is shown in FIG. 4, an outer jacket 57 of the cable 14 is stripped back to expose its outer braided shield 56. The shield 56 is terminated by a 360 degree coupler interface 42 that attaches to the flood box termination area. The power cable 14 has a overmolded conical tapered seal (not shown) that seals against the flood box 23 and the cable 14 when the two are joined. This prevents leakage of the cooling oil between the cable 14 and the flood box 23. Inside the flood box 23 are termination ferrules and clamps 43 that clamp over the coaxial cable **25*c* and the inner and outer power conductors 25*a*, 25*b*. Between the outer conductor 25*b* and the shield 56 is an extrusion 55 that allows flow of the cooling fluid 26 over the outer conductor 25b and into the flood box 23. Once the cooling fluid 26 is in the flood box 23, it is forced into an opening 44 in the end of the heat exchanger 30 that is coupled to the primary winding 34. The fluid 26 circulates around the heat exchanger 30 and exits into a tube 45 that connects to the power cable 14**.

Figure 5:
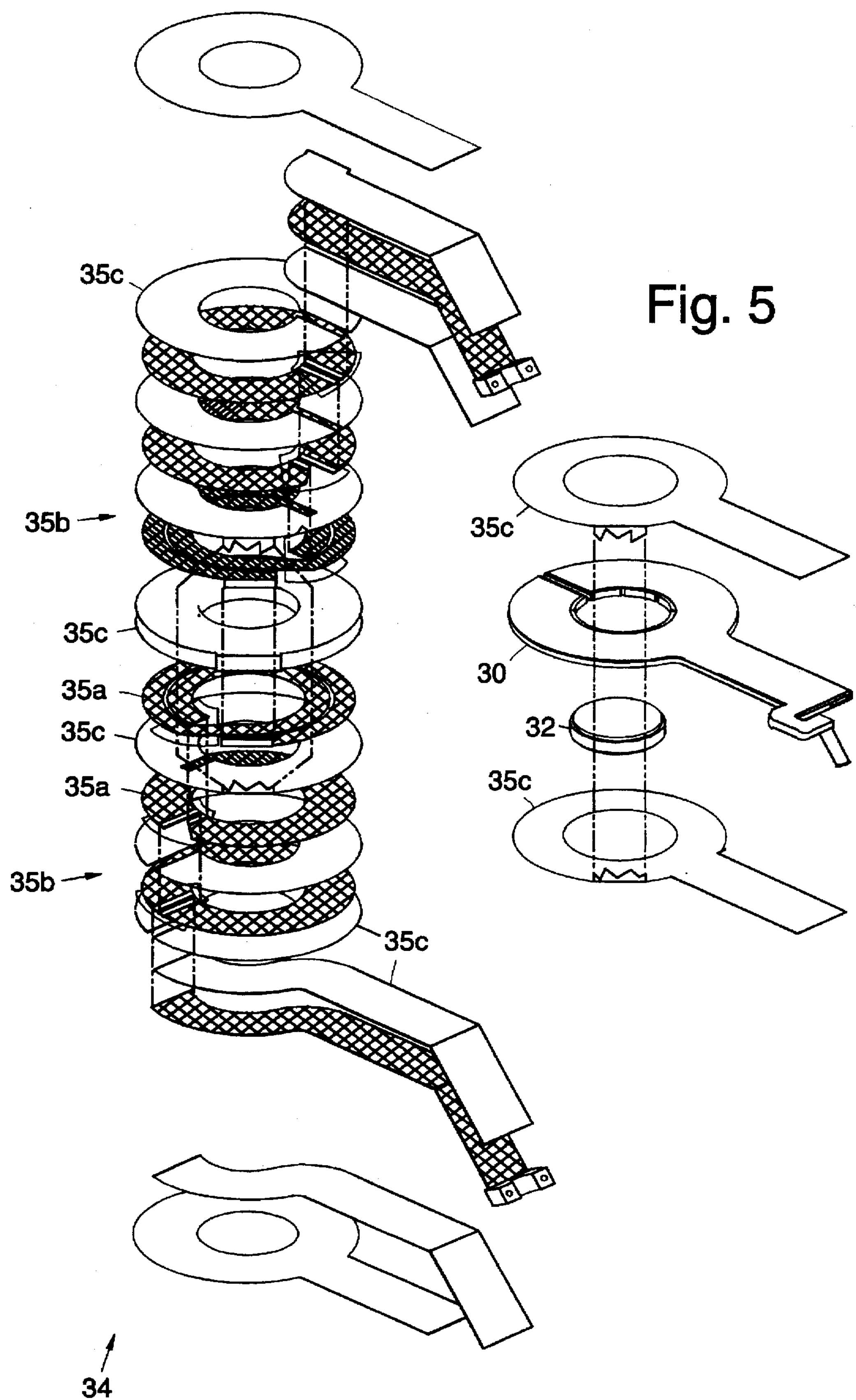
FIG. 5 shows an exploded view of the primary winding and heat exchanger assembly view of the inductive coupler of FIG. 2.

FIG. 5 shows an exploded view of the primary winding 34 and the heat exchanger 30. The primary winding 34 may be formed in a manner disclosed in U.S. Pat. No. 5,600,222, issued Feb. 4, 1997, entitled "Thermal Management Using a Hybrid Spiral/Helical Winding Geometry", for example, assigned to the assignee of the present invention, and which is incorporated herein by reference. The primary winding 34 is an eight turn helical/spiral turn primary winding 34, but the design can be made to accommodate various numbers of turns for changes in turns ratios. The puck 32 is bonded to the heat exchanger 30 for maximum heat transfer to provide for a reduction in the touch temperature of the puck 32 and coupler 20.

Figure 6:
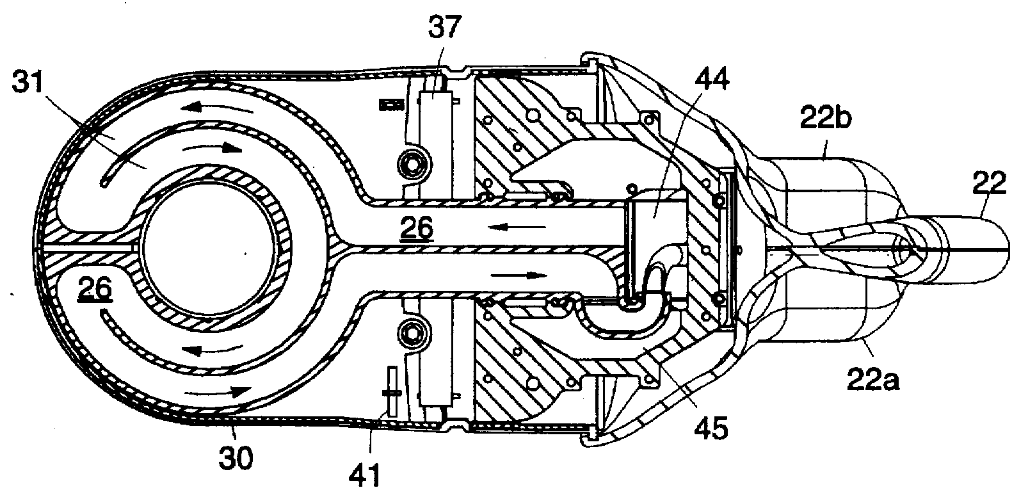
FIGS. 6 and 7 are exposed top and side views, respectively, of the inductive coupler showing the flow path of cooling fluid used therein.
Figure 7:
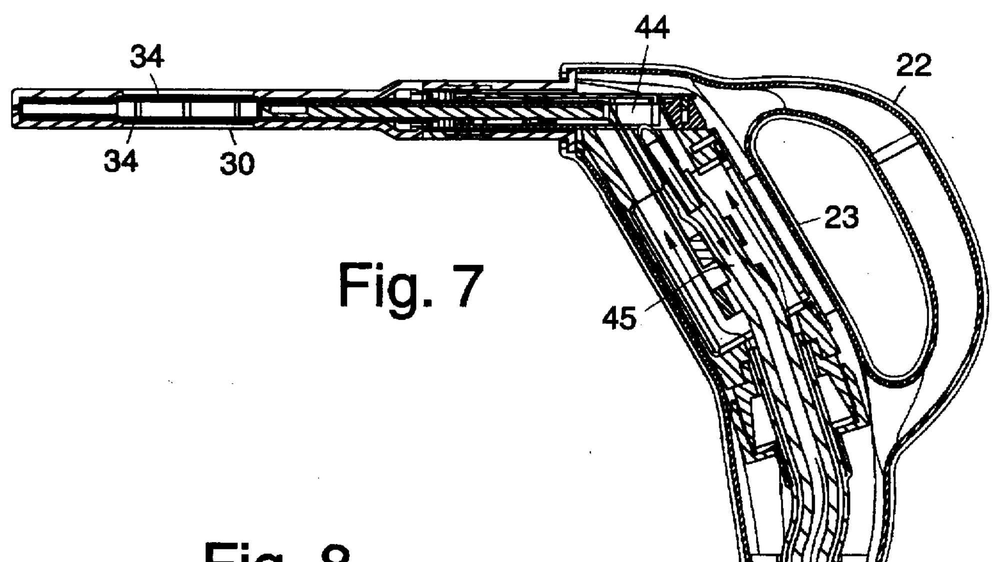

FIGS. 6 and 7 show the flow path of the cooling fluid 26 in the coupler 20, which is illustrated by the arrows. The cable termination is submerged directly in the fluid 26. The puck 32 is cooled by conducting heat out the edge of the puck 32 using thermal adhesive to the heat exchanger 30. This maintains the touch temperature of the puck 32 below 70 degrees Celsius at a 40 degrees Celsius environment temperature. The cooling fluid 26 does not have to be refrigerated to meet the touch temperature.

Figure 8:
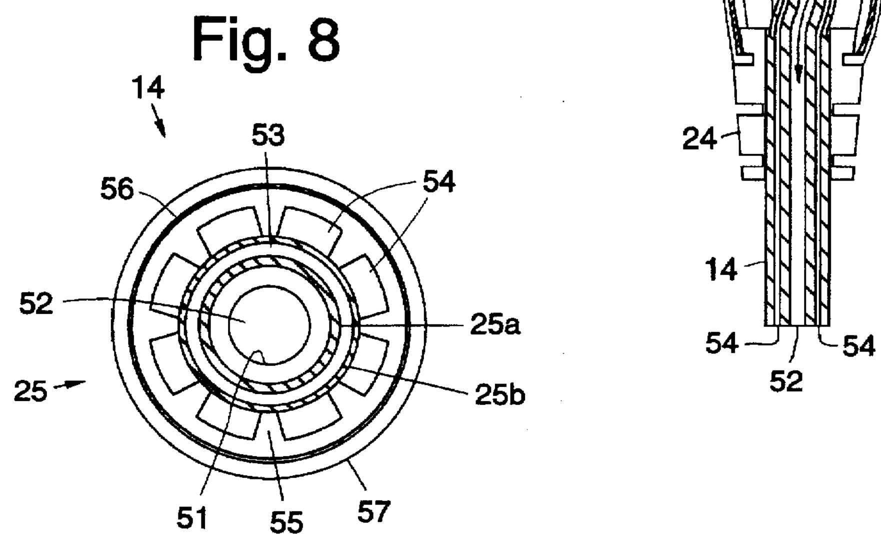
FIG. 8 shows an enlarged cross sectional view of the power cable employed in the charging system.

FIG. 8 shows an enlarged cross sectional view of the power cable 14 employed in the charging system 10. The power cable 14 transfers power from the power source 13 to the coupler 20 by way of the power conductors 25, and RF communication signals by way of carrier signals that are transmitted along the coaxial cable 25c. The cooling fluid 26 is also transferred through the power cable 14 by means of inner and outer cooling channels 52, 54 that are disposed at the center of the cable 14 and between inner and outer power conductors 25a, 25b.

The cooling channels 52, 54 are provided through the cable 14 the permit the flow of cooling fluid 26 therethrough. More specifically, the cable 14 is comprised of an inner cooling channel 52, which is surrounded by a first concentric dielectric layer 51. The first concentric dielectric layer 51 is surrounded by the inner concentric conductor 25a, which is in turn surrounded by a second concentric dielectric layer 53. The outer conductor 25b is concentrically disposed around the second concentric dielectric layer 53. A plurality of outer coolant channels 54 surround the outer conductor 25b and are formed in a grooved dielectric layer 55. An outer shield 56 is concentrically disposed around the grooved dielectric layer 55 and plurality of outer coolant channels 54. An outer dielectric jacket 57 encloses the outer shield 56.

The coupler 20 incorporates a number of features that are described with reference to other patents and patent applications of the assignee of the present invention. The coupler 20 employs the conductive plastic strips 38 to provide for EMI shielding as is described in U.S. Pat. No. 5,457,378 issued Oct. 10, 1995, entitled "Electromagnetically Shielded Inductive Charging Apparatus". The tactile feel indents 39 are described in U.S. Pat. No. 5,506,489, issued Apr. 2, 1996 entitled "Inductive Coupler Having a Tactile Feel. Locking provisions comprising the openings 27 as are described in U.S. patent application Ser. No. 08/703,277, filed Aug. 26, 1996, entitled "Charger Locking Mechanism". U.S. Pat. No. 5,434,493, filed Jul. 18, 1995 entitled "Fixed Core Inductive Charger" describes a typical fixed inductive charge port 15 with which the present coupler 20 may be used. The coupler 20 also has a raised step for the location of the conductive strips 38 so EMI fingers inside the port 15 will not rub across the whole face of the coupler 20, which minimizes unnecessary wear.

Thus, an improved high power oil cooled inductive coupler has been disclosed. It is to be understood that the above-described embodiment is merely illustrative of some of the many specific embodiments which represent applications of the principles of the present invention. Clearly, numerous and varied other arrangements may be readily devised by those skilled in the art without departing from the scope of the invention.

The embodiments of the invention in which an exclusive property or privilege is claimed are defined as follows:

1. A high power fluid cooled inductive charging coupler for use with inductive charging apparatus comprising a power source and a charge port disposed in an electric vehicle that is coupled to propulsion batteries thereof, and wherein the coupler is insertable into the charge port to couple power from the power source to charge the batteries of the electric vehicle, said coupler comprising:

a coaxial cable coupled between the power source and the coupler that comprises power conductors for coupling power to the coupler, and inlet and outlet cooling channels for coupling high dielectric strength cooling fluid to and from the coupler;

a housing;

a flood box disposed within the housing and having an open interior that forms a conductor termination area, and wherein the inlet cooling channel is coupled to the flood box to deliver fluid thereto, and wherein the power conductors of the coaxial cable are terminated in the termination area and are exposed to cooling fluid that is pumped therethrough;

a heat exchanger having a fluid inlet channel coupled to the flood box to receive cooling fluid therefrom, and an outlet channel coupled to the outlet cooling channel of said coaxial cable to return cooling fluid to said power source;

a primary winding electrically coupled to the power conductors in the termination area of said flood box, and thermally coupled to the heat exchanger; and a magnetic puck disposed in an opening in the heat exchanger;

and wherein the cooling fluid is pumped through the inlet and outlet channels of the coaxial cable, the flood box and the inlet and outlet channels of the heat exchanger to cool the primary winding, the puck, the power conductor terminations, and the power conductors to permit high power levels to be transferred between the power source and the propulsion batteries of the electric vehicle.

2. The inductive charging coupler of claim 1, wherein the cooling fluid is poly alpha olefin.

* * * * *